United States Patent [19]
Hagiwara

[11] Patent Number: 6,150,658
[45] Date of Patent: Nov. 21, 2000

[54] PASSIVE INFRARED DETECTOR

[75] Inventor: Hiroshi Hagiwara, Hamamatsu, Japan

[73] Assignee: Atsumi Electric Co., Ltd., Hamamatsu, Japan

[21] Appl. No.: 09/174,552

[22] Filed: Oct. 19, 1998

[30] Foreign Application Priority Data

Oct. 20, 1997 [JP] Japan ..................................... 9-286555

[51] Int. Cl.[7] ................................................. G08B 13/19
[52] U.S. Cl. .................. 250/338.1; 250/349; 250/DIG. 1
[58] Field of Search ........................... 250/338.1, DIG. 1, 250/349, 342, 353

[56] References Cited

U.S. PATENT DOCUMENTS

| | | | |
|---|---|---|---|
| 4,514,630 | 4/1985 | Takahashi | 250/342 |
| 4,514,631 | 4/1985 | Guscott | 250/342 |
| 5,414,255 | 5/1995 | Hampson | 250/DIG. 1 |
| 5,489,892 | 2/1996 | Imuro et al. | 250/338.1 |

Primary Examiner—Constantine Hannaher
Assistant Examiner—Otilia Gabor
Attorney, Agent, or Firm—Armstrong, Westerman, Hattori, McLeland & Naughton

[57] ABSTRACT

A passive infrared detector that enables the extent of the field to be 360 degrees in circumference with a simple arrangement and allows the field range in the vertical direction to be adjusted wholly or partially. A plurality of sensor units are circumferentially arranged on a sensor mounting plate. Each sensor unit has a reflecting mirror and a sensing element placed at the focus position of the mirror. Each sensor unit is rotatable in the vertical direction. A slot is formed radially in the sensor mounting plate opposite to each sensor unit. A rotating plate is rotatably mounted on the sensor mounting plate. A circumferential slit is formed circumferentially in the rotating plate such that the distance from the center of the rotating plate to the circumferential slit gradually decreases. An adjusting rod is connected at one end thereof to each sensor unit. The other end of the adjusting rod extends through the slot and the circumferential slit.

4 Claims, 5 Drawing Sheets

FIG. 4
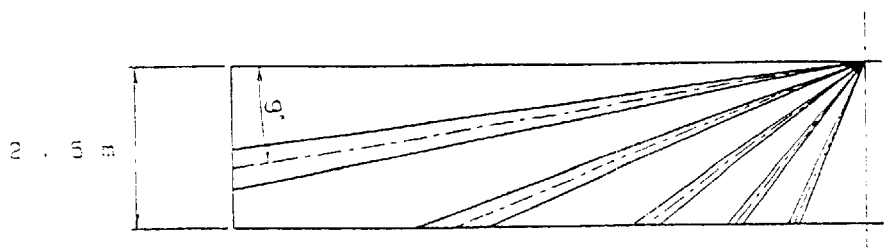
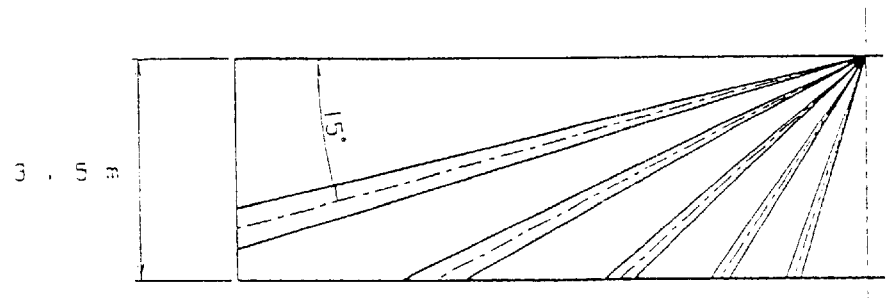
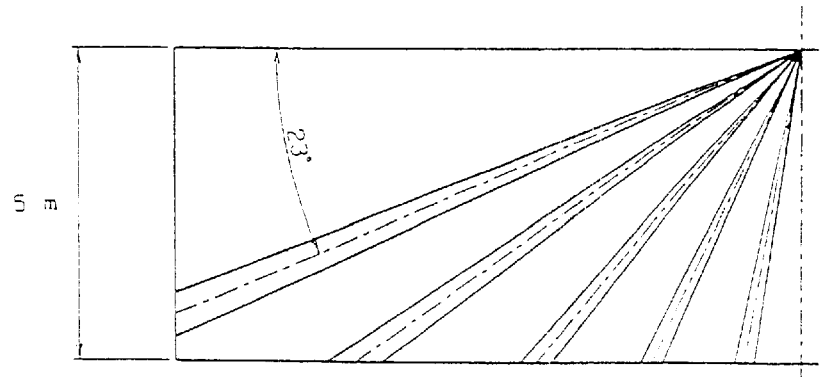
FIG. 5
| Ceiling height | Longest monitoring distance | | | |
|---|---|---|---|---|
| | 4 m | 6 m | 8 m | 10 m |
| 2.5 m | A | B | D | F |
| 3 m | — | A | D | E |
| 3.5 m | — | — | D | D |
| 4 m | — | — | A | C |
| 4.5 m | — | — | — | B |
| 5 m | — | — | — | A |

PASSIVE INFRARED DETECTOR

BACKGROUND OF THE INVENTION

The present invention relates to a passive infrared detector used in a burglar alarm system for detecting an intruder.

A passive infrared detector detects a moving object that radiates infrared rays. The passive infrared detector has an optical system, e.g. a reflecting mirror or a lens, for determining an area for detecting a moving object. The passive infrared detector further has a pyroelectric element placed at the focus position of the optical system, and a signal processing circuit. When the output level of the pyroelectric element exceeds a threshold value, the signal processing circuit outputs an alarm signal indicating that a moving object has been detected.

Hitherto, Japanese Utility Model Application Unexamined Publication (KOKAI) No. 1-46890, for example, discloses an optical system of a passive infrared detector that enables the extent of the field to be 360 degrees in circumference. However, the conventional system has a very complicated structure and also requires a reflecting mirror difficult to design. Furthermore, when it is desired to narrow the monitoring zone in a certain direction on account of the installation place, the conventional system must employ a technique known as mirror masking, in which a portion of the reflecting mirror that corresponds to the certain direction is masked. Thus, the conventional system involves a troublesome operation and is not favorable from the viewpoint of effectively utilizing the reflecting mirror.

To solve the above-described problems, the present applicant proposed in Japanese Patent Application No. 9-54401 a passive infrared detector having sensor units comprising a plurality of reflecting mirrors that form monitoring zones and sensing elements placed at the respective focus positions of the reflecting mirrors. The passive infrared detector enables the extent of the field to be approximately 360 degrees in circumference with a simple arrangement and also allows the field range in the vertical direction to be partially adjusted.

However, the proposed passive infrared detector as described above involves some problems to be solved in terms of specific structures for adjusting the field range in the vertical direction and for partially adjusting the field range in the vertical direction.

SUMMARY OF THE INVENTION

The present invention was made in view of the above-described problems, and it is an object of the present invention to provide a passive infrared detector that enables the extent of the field to be 360 degrees in circumference with a simple arrangement and moreover allows the field range in the vertical direction to be adjusted wholly or partially.

To attain the above-described object, the present invention provides a passive infrared detector including a plurality of sensor units having reflecting mirrors and sensing elements placed at the respective focus positions of the reflecting mirrors. A sensor mounting plate has the sensor units arranged thereon in the circumferential direction. Each sensor unit is rotatable in the vertical direction. A slot is formed radially in the sensor mounting plate opposite to each of the sensor units. A rotating plate is rotatably mounted on the sensor mounting plate. A circumferential slit is formed circumferentially in the rotating plate such that the distance from the center of the rotating plate to the circumferential slit gradually decreases. An adjusting rod is connected at one end thereof to each sensor unit. The other end of the adjusting rod extends through the slot and the circumferential slit. Movement of the circumferential slit caused by rotation of the rotating plate is transmitted to the adjusting rod to cause the adjusting rod to move in the slot, thereby enabling the vertical angle of each sensor unit to be adjusted.

Preferably, an indicating projection is provided on the outer periphery of the rotating plate, and a ceiling height is indicated on the sensor mounting plate opposite to the indicating projection.

Preferably, the passive infrared detector further includes a radial slit communicated with the circumferential slit and extending straight in the radial direction of the rotating plate to enable the vertical angle of each sensor unit to be adjusted individually.

In the above-described passive infrared detector, a monitoring distance setting character is preferably indicated on a side of the radial slit.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is a diagram for describing the ceiling height and the angle adjustment of the sensor unit.

FIG. 5 is a diagram showing a table for setting the longest monitoring distance.

DESCRIPTION OF THE PREFERRED EMBODIMENTS

Figure 6:
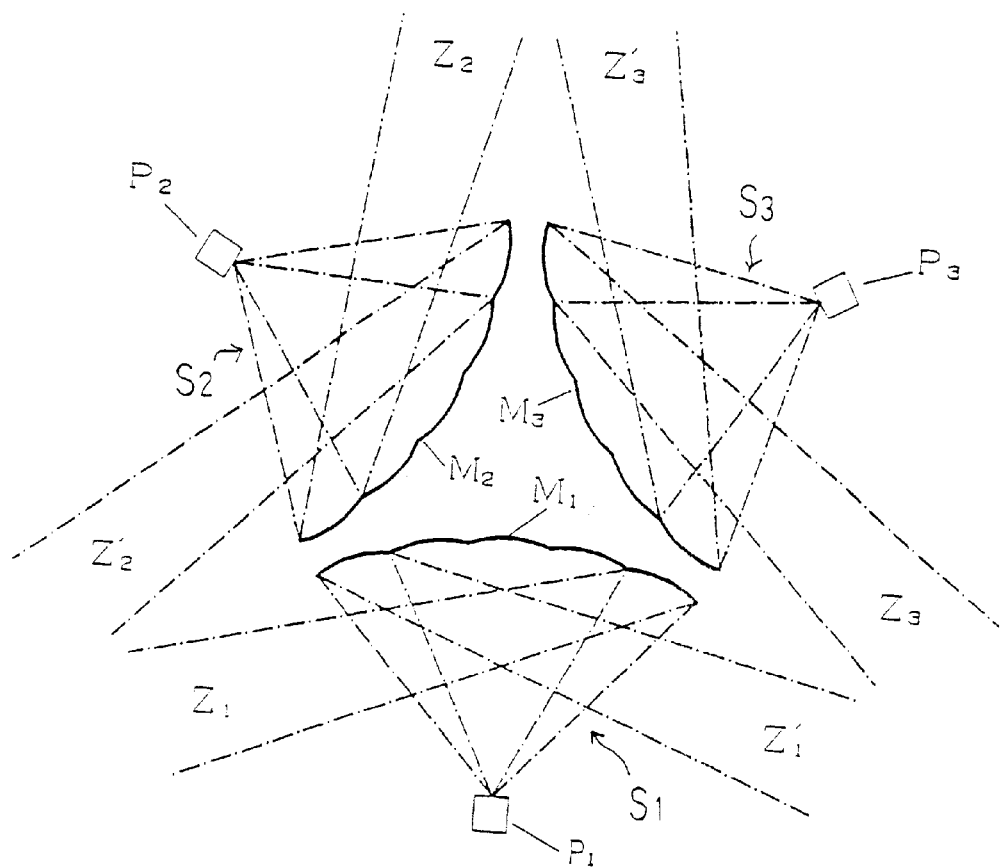
FIG. 6 is a plan view for describing an outline of a passive infrared detector according to the present invention.
Figure 7:
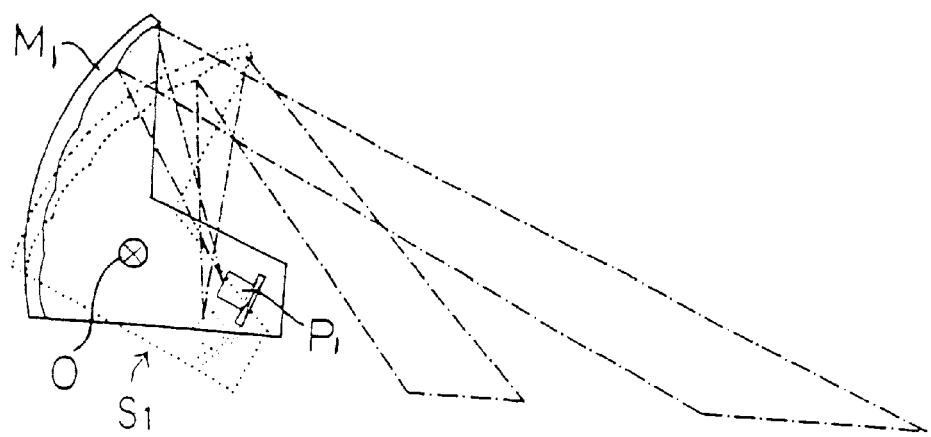
FIG. 7 is a side view for describing the angle adjustment in the vertical direction for each sensor unit of the passive infrared detector shown in FIG. 6.

One embodiment of the present invention will be described below with reference to the accompanying drawings. FIGS. 6 and 7 are diagrams showing an outline of a passive infrared detector according to the present invention. In the figures, $M_1$, $M_2$ and $M_3$ denote reflecting mirrors, and $P_1$, $P_2$ and $P_3$ denote pyroelectric elements, which are sensing elements.

The reflecting mirror $M_1$ has a plurality of partial mirrors. Each partial mirror forms one monitoring zone. The focal points of the partial mirrors are at the same position, and the pyroelectric element $P_1$ is laced at the focus position.

In other words, the reflecting mirror $M_1$ and the pyroelectric element $P_1$ constitute one sensor unit $S_1$. The extent of the field of the monitoring zones formed by the mirror portions at both ends of the reflecting mirror $M_1$, that is, the extent of an area between the monitoring zone $Z_1$ and the monitoring zone $Z_1'$ in FIG. 6, is set at about 120 degrees.

Furthermore, the sensor unit $S_1$, which comprises the reflecting mirror $M_1$ and the pyroelectric element $P_1$, is capable of adjusting the angle in the vertical direction (up and down), as shown in FIG. 7. In FIG. 7, the angle can be adjusted in the vertical direction about the center O of rotation within the range shown by the solid and dashed lines. It should be noted that such a vertical angle adjusting mechanism is widely employed in conventional passive infrared detectors; therefore, a detailed description thereof is omitted.

In view of the foregoing description, the sensor unit $S_1$, which comprises the reflecting mirror $M_1$ and the pyroelectric element $P_1$, may be called an ordinary passive infrared detector in which the extent of the field is about 120 degrees in circumference and which has a vertical angle adjusting mechanism.

The same is the case with a sensor unit $S_2$, which comprises the reflecting mirror $M_2$ and the pyroelectric element $P_2$, and a sensor unit $S_3$, which comprises the reflecting mirror $M_3$ and the pyroelectric element $P_3$. The extent of the area between the monitoring zone $Z_2$ and the monitoring zone $Z_2'$ is set at about 120 degrees, and the extent of the area between the monitoring zone $Z_3$ and the monitoring zone $Z_3'$ is set at about 120 degrees. The sensor units $S_2$ and $S_3$, which comprise the reflecting mirrors $M_2$ and $M_3$ and the pyroelectric elements $P_2$ and $P_3$, respectively, are also capable of adjusting the angle in the vertical direction as shown in FIG. 7.

The above-described three sensor units $S_1$ to $S_3$ are disposed such that the reflecting mirrors $M_1$ to $M_3$ are located back to back. It will be clear that the described arrangement enables the extent of the field to be approximately 360 degrees in circumference. Moreover, because each sensor unit is capable of adjusting the angle in the vertical direction, when it is desired to narrow the monitoring zone in a certain direction owing to the circumstances at the installation place, it is possible to cope with the demand by making adjustment such that the vertical angle of a sensor unit having a monitoring zone in that direction is increases.

Figure 1A:
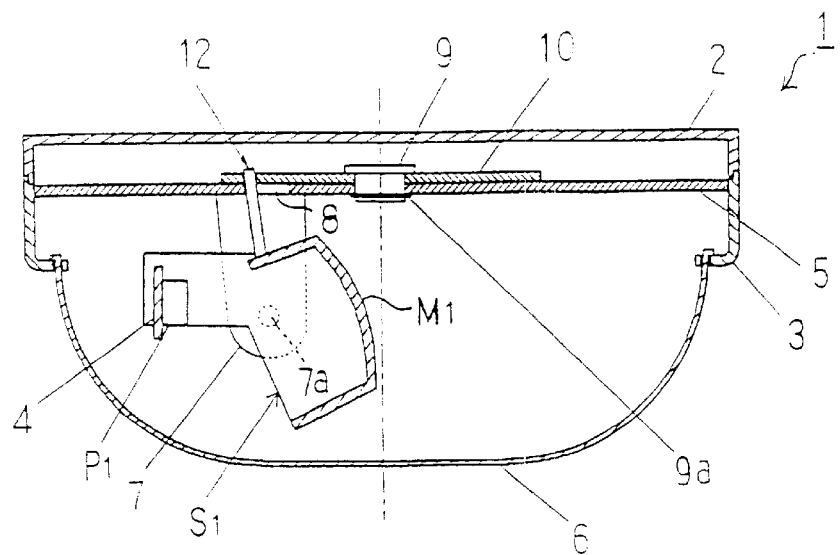
FIGS. 1A and 1B are diagrams showing one embodiment of a passive infrared detector according to the present invention, in which part (A) is a sectional view, and part (B) is a plan view showing the embodiment shown in part (A) with a base member detached therefrom.
Figure 1B:
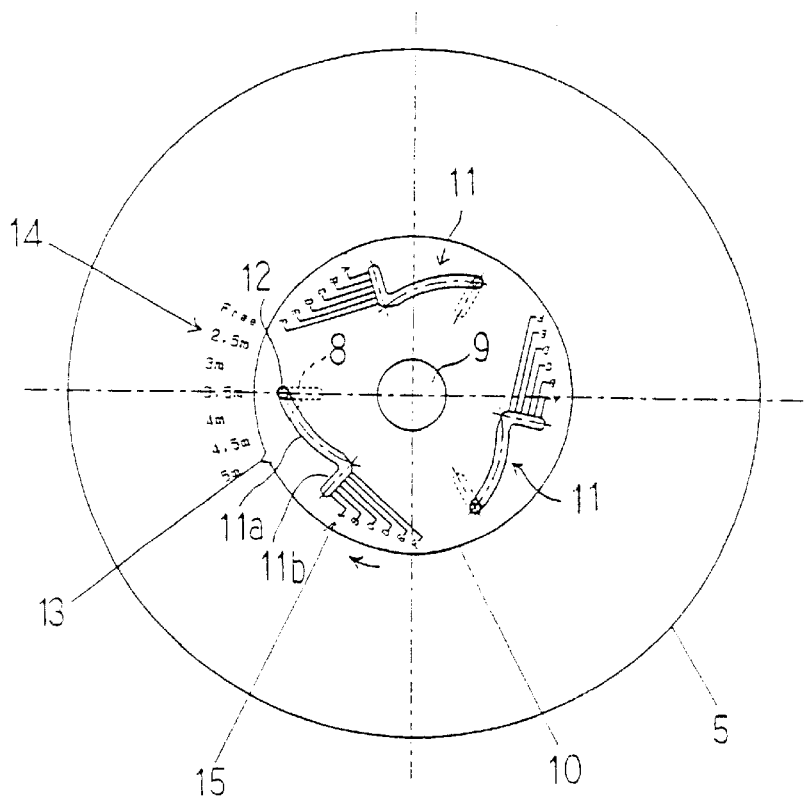
Figure 2A:
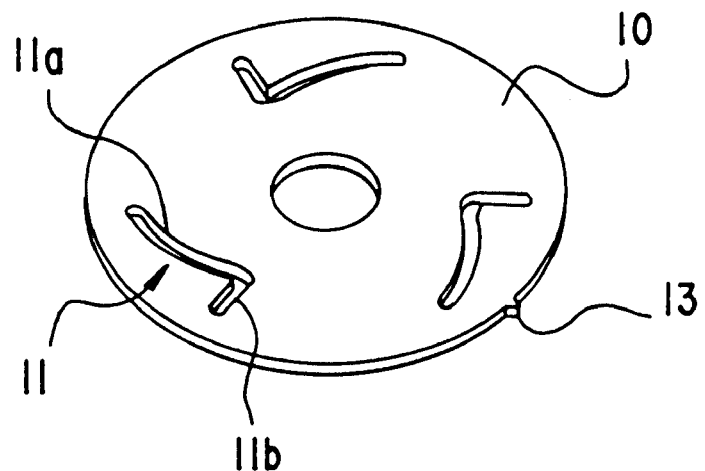
FIGS. 2A and 2B are an exploded perspective view of a rotating plate and a sensor mounting plate, which are shown in FIG. 1.
Figure 2B:
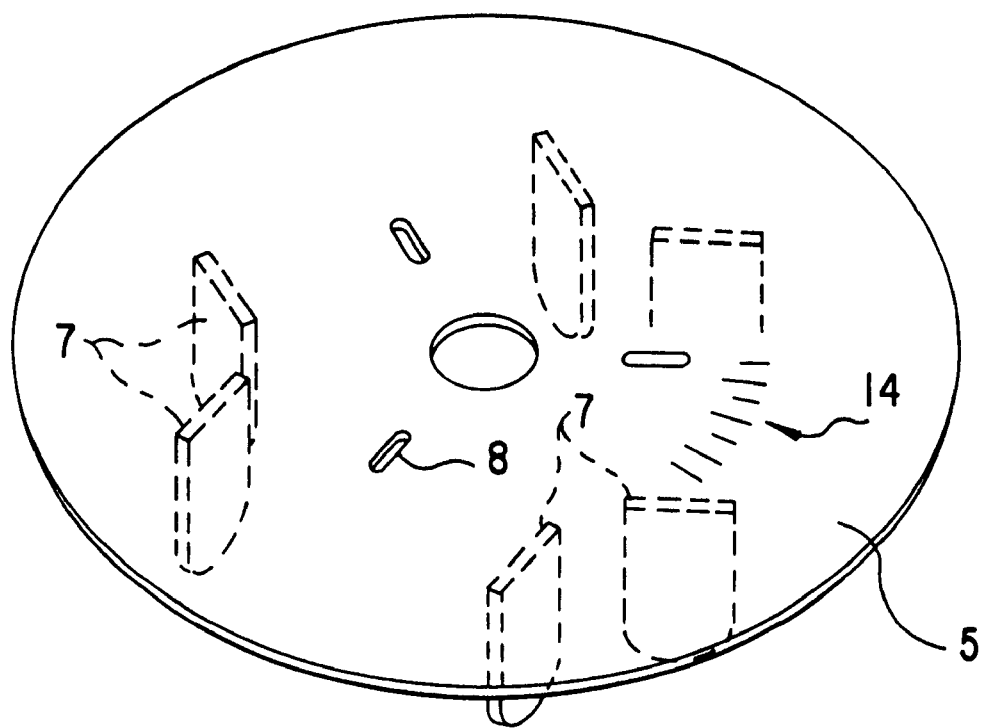

FIGS. 1A, 1B, 2A and 2B show one embodiment of the passive infrared detector according to the present invention. FIG. 1A is a sectional view, and FIG. 1B is a plan view showing the embodiment shown in part (A) of FIG. 1A with a base member detached therefrom. FIGS. 2A and 2B is an exploded perspective view of a rotating plate and a sensor mounting plate, which are shown in FIGS. 1A and 1B.

A passive infrared detector 1 has a base member 2 in the shape of a cylinder, one end of which is closed. The base member 2 is secured to a ceiling surface. A cylindrical case member 3 is thread-engaged with the base ember 2. A sensor mounting plate 5 is secured in such a way as to cover the top of the case member 3. A cover member 6 is detachably mounted in such a way as to cover the bottom of the case member 3.

As shown in FIG. 2B, the sensor mounting plate 5 is provided with three sets of support stays 7 for mounting the above-described three sensor units $S_1$ to $S_3$ in the circumferential direction. In FIG. 1A, only the sensor unit $S_1$, which comprises the reflecting mirror $M_1$ and the pyroelectric element $P_1$, is shown. The sensor unit $S_1$ is rotatably supported by a shaft 7a provided on the associated support stays 7, thereby enabling adjustment of the angle in the vertical direction. The sensor mounting plate 5 is formed with three slots 8 that face opposite to the three sensor units $S_1$ to $S_3$, respectively. It should be noted that reference numeral 4 denotes a printed circuit board for mounting the pyroelectric element $P_1$.

A fixed shaft 9 is fixed in the center of tie sensor mounting plate 5 with a fastening member 9a. A rotating plate 10 is rotatably fitted on the fixed shaft 9. The rotating plate 10 is formed with three adjusting slits 11 for adjusting the angles of the three sensor units $S_1$ to $S_3$. Each adjusting slit 11 has a circumferential slit 11a formed in the circumferential direction of the rotating plate 10 such that the distance from the center of the rotating plate 10 to the circumferential slit 11a gradually decreases. Each adjusting slit 11 further has a radial slit 11b that is communicated with one end of the circumferential slit 11a and extends in a straight-line shape toward the radially outer side of the rotating plate 10. It should be noted that the location of the radial slit 11b may be at any desired position on the circumferential slit 11a. In short, it is only necessary for each radial slit 11b to align with the associated slot 8 at a certain position (position "Free") when the rotating plate 10 is rotated. Accordingly, the radial slit 11b is formed with the same configuration as that of the slot 8.

One end of an adjusting rod 12 is connected and secured to the top of each of the three sensor units $S_1$ to $S_3$. The other end of the adjusting rod 12 extends through the associated slot 8 of the sensor mounting plate 5 and further through the associated adjusting slit 11 of the rotating plate 10 and projects from the upper side of the rotating plate 10. An indicating projection 13 is provided on the outer periphery of the rotating plate 10. Ceiling heights (5 m, 4.5 m, 4 m, 3.5 m, 3 m, 2.5 m, and Free) 14 are indicated on the sensor mounting plate 5 opposite to the indicating projection 13. In addition, monitoring distance setting characters (A to F) 15 are indicated on one side of each radial slit 11b of the rotating plate 10.

Figure 3A:
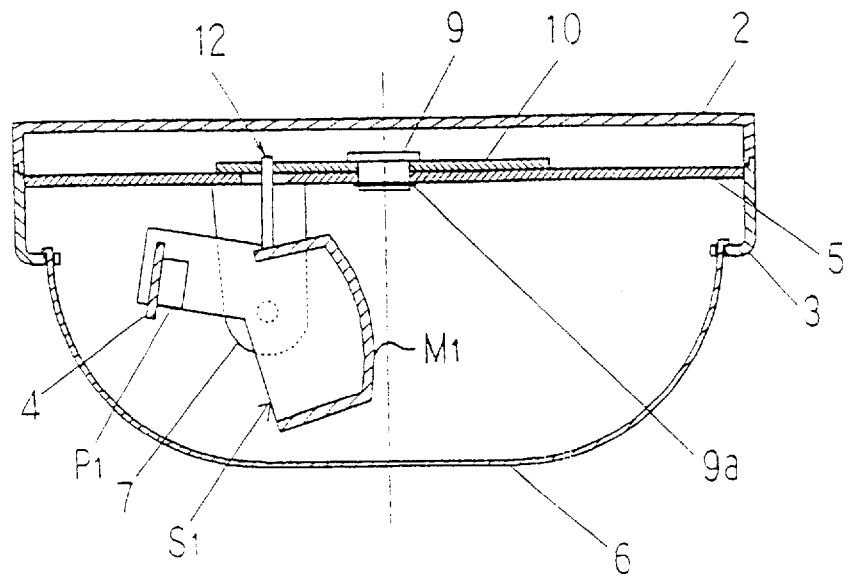
FIGS. 3A and 3B are diagrams similar to FIG. 1, which shows the condition of the sensor unit when the rotating plate is rotated.
Figure 3B:
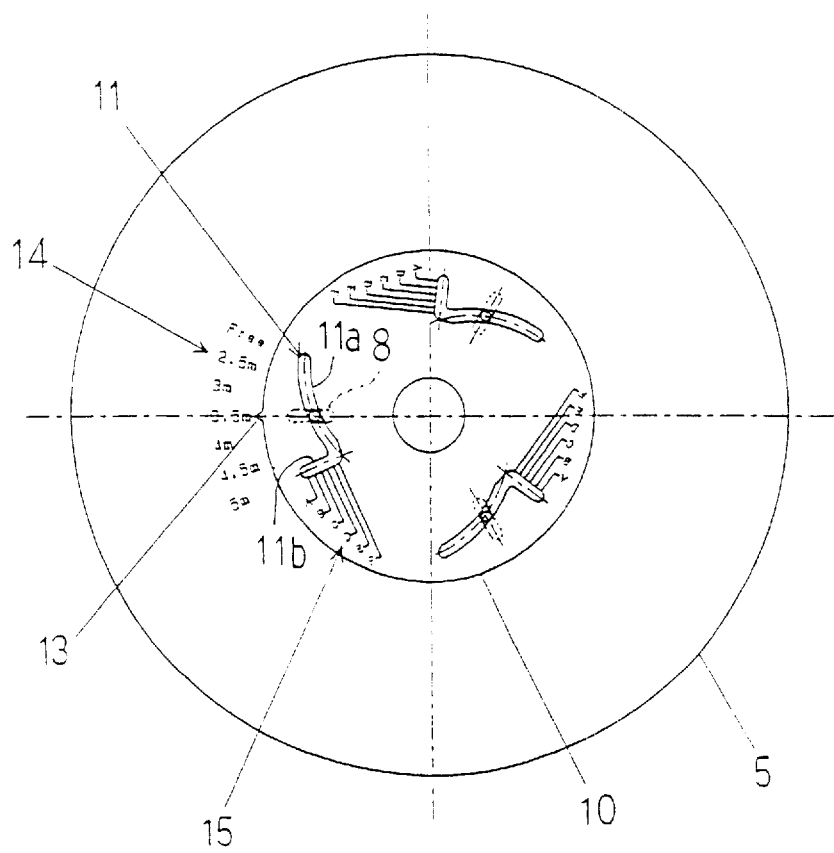

The angle adjustment of the passive infrared detector according to the present invention, which is arranged as stated above, will be described. FIGS. 3A and 3B is a diagram similar to FIGS. 1A and 1B, which shows the condition of the sensor unit $S_1$ when the rotating plate 10 is rotated.

FIG. 1A shows a state where the ceiling height is set at 5 meters. When the rotating plate 10 in this state is rotated clockwise as viewed in the figure, the adjusting rod 12 moves along the circumferential slit 11a of the slit 11. Consequently, the adjusting rod 12 is caused to move rightward in the slot 8 as viewed in the figure by the movement of the circumferential slit 11a. In a case where the indicating projection 13 is set at the position of ceiling height 3.5 meters, the state shown in FIG. 3 is attained. Consequently, the sensor unit $S_1$ is rotated clockwise about the shaft 7a and thus adjusted to a state where the angle with respect to the ceiling surface is reduced.

FIG. 4 is a diagram for describing the ceiling height and the angle adjustment of the sensor unit. FIG. 4 shows that it is necessary to set a monitoring zone according to the ceiling height by adjusting the angle of the sensor unit such that as the ceiling height increases from 2.5 meters through 3.5 meters to 5 meters, the angle of the sensor unit increases from 9 degrees through 15 degrees to 23 degrees, that is, the sensor unit is gradually directed downward.

Next, an operation performed when the indicating projection 13 is set at the position "Free" will be described. In this case, the adjusting rod 12 is movable along the radial slit 11b of the adjusting slit 11. Therefore, the vertical angles of the three sensor units $S_1$ to $S_3$ can be adjusted individually by directly rotating the three sensor units $S_1$ to $S_3$. Accordingly, when there is a heat source in the sensing area of the sensor units $S_1$ to $S_3$, it is possible to avoid the heat source. In this case, it is possible to find the longest monitoring distance from the monitoring distance setting characters (A to F) 15 and a distance setting table shown in FIG. 5. For example, when the ceiling height is 3 meters and the longest monitoring distance desired is 8 meters, the adjusting rod 12 should be set at the position "D".

Although one embodiment of the present invention has been described above, the present invention is not limited to the described embodiment but can be modified in a variety of ways. For example, although the foregoing embodiment uses three sensor units in each of which the extent of the field is approximately 120 degrees in circumference and the angle in the vertical direction is adjustable, it is also possible to use four sensor units in each of which the extent of the field is approximately 90 degrees in circumference and the angle in the vertical direction is adjustable.

As will be clear from the foregoing description, the present invention enables the extent of the field to be 360 degrees in circumference with a simple arrangement and moreover allows the field range in the vertical direction to be adjusted wholly or partially.

What I claim is:

1. A passive infrared detector comprising:

a plurality of sensor units each including a reflecting mirror and a sensing element placed at a position of a focus of said reflecting mirror;

a sensor mounting plate having said sensor units arranged thereon in a circumferential direction, each sensor unit being rotatable in a vertical direction;

a slot formed radially in said sensor mounting plate opposite to each of said sensor units;

a rotating plate rotatably mounted on said sensor mounting plate;

a circumferential slit former circumferentially in said rotating plate such that a distance from a center of said rotating plate to said circumferential slit gradually decreases; and an adjusting rod connected at one end thereof to each sensor unit, the other end of said adjusting rod extending through said slot and said circumferential slit;

wherein movement of said circumferential slit caused by rotation of said rotating plate is transmitted to said adjusting rod to cause said adjusting rod to move in said slot, thereby enabling a vertical angle of each sensor unit to be adjusted.

2. A passive infrared detector according to claim 1, wherein an indicating projection is provided on an outer periphery of said rotating plate, and a ceiling height is indicated on said sensor mounting plate opposite to said indicating projection.

3. A passive infrared detector according to claim 1, further comprising a radial slit communicated with said circumferential slit and extending straight in a radial direction of said rotating plate to enable the vertical angle of each sensor unit to be adjusted individually.

4. A passive infrared detector according to claim 3, wherein a monitoring distance setting character is indicated on a side of said radial slit.

* * * * *